(12) United States Patent
Rouhani et al.

(10) Patent No.: US 11,972,408 B2
(45) Date of Patent: Apr. 30, 2024

(54) DIGITAL WATERMARKING OF MACHINE LEARNING MODELS

(71) Applicant: The Regents of the University of California, Oakland, CA (US)

(72) Inventors: Bita Darvish Rouhani, San Diego, CA (US); Huili Chen, San Diego, CA (US); Farinaz Koushanfar, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 637 days.

(21) Appl. No.: 17/042,773

(22) PCT Filed: Mar. 21, 2019

(86) PCT No.: PCT/US2019/023471
§ 371 (c)(1),
(2) Date: Sep. 28, 2020

(87) PCT Pub. No.: WO2019/190886
PCT Pub. Date: Oct. 3, 2019

(65) Prior Publication Data
US 2021/0019605 A1    Jan. 21, 2021

Related U.S. Application Data

(60) Provisional application No. 62/649,926, filed on Mar. 29, 2018.

(51) Int. Cl.
*G06N 3/048* (2023.01)
*G06F 21/16* (2013.01)
(Continued)

(52) U.S. Cl.
CPC ......... *G06Q 20/1235* (2013.01); *G06F 21/16* (2013.01); *G06N 3/045* (2023.01);
(Continued)

(58) Field of Classification Search
CPC .. G06N 3/00; G06N 5/00; G06N 7/00; G06N 20/00; G06N 99/00
See application file for complete search history.

(56) References Cited

U.S. PATENT DOCUMENTS 9,053,431 B1    6/2015   Commons
9,305,559 B2    4/2016   Sharma et al.
(Continued)

OTHER PUBLICATIONS

Guang-Bin Huang, Yan-Qiu Chen and H. A. Babri, "Classification ability of single hidden layer feedforward neural networks," in IEEE Transactions on Neural Networks, vol. 11, No. 3, pp. 799-801, May 2000, doi: 10.1109/72.846750. (Year: 2000).*

(Continued)

*Primary Examiner* — Kakali Chaki
*Assistant Examiner* — Johnathan R Germick
(74) *Attorney, Agent, or Firm* — Mintz Levin Cohn Ferris Glovsky and Popeo, P.C.

(57) ABSTRACT

A method may include embedding, in a hidden layer and/or an output layer of a first machine learning model, a first digital watermark. The first digital watermark may correspond to input samples altering the low probabilistic regions of an activation map associated with the hidden layer of the first machine learning model. Alternatively, the first digital watermark may correspond to input samples rarely encountered by the first machine learning model. The first digital watermark may be embedded in the first machine learning model by at least training, based on training data including the input samples, the first machine learning model. A second machine learning model may be determined to be a duplicate of the first machine learning model based on a comparison of the first digital watermark embedded in the first machine learning model and a second digital watermark extracted from the second machine learning model.

19 Claims, 8 Drawing Sheets

(51) Int. Cl.

| | |
|---|---|
| *G06N 3/045* | (2023.01) |
| *G06N 3/063* | (2023.01) |
| *G06N 7/01* | (2023.01) |
| *G06Q 20/12* | (2012.01) |
| *G06V 10/82* | (2022.01) |

(52) U.S. Cl.
CPC ............. *G06N 3/048* (2023.01); *G06N 3/063* (2013.01); *G06N 7/01* (2023.01); *G06V 10/82* (2022.01)

(56) References Cited

U.S. PATENT DOCUMENTS

| 9,594,983 B2 | 3/2017 | Alattar et al. |
|---|---|---|
| 2003/0095683 A1 | 5/2003 | Najarian |
| 2018/0005343 A1 | 1/2018 | Rhoads et al. |

OTHER PUBLICATIONS

Zhang, J., Gu, Z., Jang, J., Wu, H., Stoecklin, M., Huang, H., & Molloy, I. (2018). Protecting Intellectual Property of Deep Neural Networks with Watermarking. In Proceedings of the 2018 on Asia Conference on Computer and Communications Security (pp. 159-172). Association for Computing Machinery. (Year: 2018).*

O. Ludwig and U. Nunes, "Novel Maximum-Margin Training Algorithms for Supervised Neural Networks," in IEEE Transactions on Neural Networks, vol. 21, No. 6, pp. 972-984, Jun. 2010, doi: 10.1109/TNN.2010.2046423. (Year: 2010).*

Yusuke Uchida, Yuki Nagai, Shigeyuki Sakazawa, & Shin'ichi Satoh (2017). Embedding Watermarks into Deep Neural Networks. In Proceedings of the 2017 ACM on International Conference on Multimedia Retrieval. ACM. (Year: 2017).*

Erwan Le Merrer, Patrick Perez, & Gilles Trédan. (2017). Adversarial Frontier Stitching for Remote Neural Network Watermarking. (Year: 2017).*

Lapedes, A., & Farber, R. (1987). How Neural Nets Work. In Neural Information Processing Systems. American Institute of Physics (Year: 1987).*

Choromanska, A. et al., "The Loss Surfaces of Multilayer Networks." In Artificial Intelligence and Statistics, pp. 192-204, 2015.

Dauphin, Y.N. et al., "Identifying and Attacking the Saddle Point Problem in Highdimensional Nonconvex Optimization." In Advances in neural information processing systems, pp. 2933-2941, 2014.

Furht, B. et al., "Multimedia Security Handbook." CRC press, 2004.

Goodfellow, I. et al., "Explaining and Harnessing Adversarial Examples." arXiv preprint arXiv:1412.6572, 2014.

Goodfellow, I. et al. "Deep learning, vol. 1." MIT press Cambridge, 2016.

Grosse, K. et al., "On the (Statistical) Detection of Adversarial Examples." arXiv preprint arXiv:1702.06280, 2017.

Han, S. et al., "Deep compression: Compressing deep neural networks with pruning, trained quantization and huffman coding," arXiv preprint arXiv:1510.00149, 2015.

Han, S. et al., "Learning Both Weights and Connections for Efficient Neural Network." In Advances in neural information processing systems, pp. 1135-1143, 2015.

Hartung, F. et al., "Multimedia Watermarking Techniques." Proceedings of the IEEE, 87(7):1079-1107, 1999.

Krizhevsky, A. et al., "Learning multiple layers of features from tiny images," 2009.

LeCun, Y. et al., "The MNIST database of handwritten digits," 1998.

LeCun, Y. et al., "Deep Learning." Nature, 521(7553):436, 2015.

Lin, D. et al., "Fixed Point Quantization of Deep Convolutional Networks." In International Conference on Machine Learning, pp. 2849-2858, 2016.

Papernot, N. et al., "Practical Black-Box Attacks Against Machine Learning." In Proceedings of the 2017 ACM on Asia Conference on Computer and Communications Security, pp. 506-519. ACM, 2017.

Qu, G. et al., "Intellectual Property Protection in VLSI designs: Theory and Practice." Springer Science & Business Media, 2007.

Rouhani, B.D. et al., "Delight: Adding Energy Dimension to Deep Neural Networks." In Proceedings of the 2016 International Symposium on Low Power Electronics and Design, pp. 112-117. ACM, 2016.

Simonyan, K. et al., "Very Deep Convolutional Networks for Largescale Image Recognition." arXiv preprint arXiv:1409.1556, 2014.

Zagoruyko, S. et al., "Wide Residual Networks." arXiv preprint arXiv:1605.07146, 2016.

* cited by examiner

DIGITAL WATERMARKING OF MACHINE LEARNING MODELS

RELATED APPLICATION

This application is a national stage entry of Patent Cooperation Treaty Application No. PCT/US2019/023471 filed Mar. 21, 2019, entitled "DIGITAL WATERMARKING OF MACHINE LEARNING MODELS," which claims priority to U.S. Provisional Patent Application No. 62/649,926 filed on Mar. 29, 2018, entitled "DEEPSIGN: A GENERIC FRAMEWORK FOR WATERMARKING AND IP PROTECTION OF DEEP LEARNING MODELS," the disclosures of which are incorporated herein by reference in their entirety.

TECHNICAL FIELD

The subject matter described herein relates generally to machine learning and more specifically to embedding and extracting digital watermarks from machine learning models.

BACKGROUND

Machine learning models may be trained to perform a variety of cognitive tasks including, for example, object identification, natural language processing, information retrieval, and speech recognition. A deep learning model such as, for example, a neural network, a belief network, a restricted Boltzmann machine, and/or the like, may be trained to perform a regression task. The regression task may require the deep learning model to predict, based at least on variations in one or more independent variables, corresponding changes in one or more dependent variables. Alternatively and/or additionally, a deep learning model may be trained to perform a classification task by at least assigning input samples to one or more categories. The deep learning model may be trained to perform the classification task based on training data that has been labeled in accordance with the known category membership of each sample included in the training data.

SUMMARY

Systems, methods, and articles of manufacture, including computer program products, are provided for embedding a digital watermark in a machine learning model. In some example embodiments, there is provided a system that includes at least one processor and at least one memory. The at least one memory may include program code that provides operations when executed by the at least one processor. The operations may include: identifying, based at least on a first activation map associated with a first hidden layer of a first machine learning model, a first plurality of input samples altering one or more low probabilistic regions of the first activation map, the first hidden layer including a plurality of neurons, each of the plurality of neurons applying an activation function to generate an output, and the one or more low probabilistic regions of the first activation map being occupied by values having a below threshold probability of being output by the plurality of neurons; embedding, in the first hidden layer of the first machine learning model, a first digital watermark corresponding to the first plurality of input samples, the embedding of the first digital watermark includes training, based at least on training data including the first plurality of input samples, the first machine learning model; and determining that a second machine learning model is a duplicate of the first machine learning model based at least on a comparison of the first digital watermark embedded in the first machine learning model and a second digital watermark extracted from the second machine learning model.

In some variations, one or more features disclosed herein including the following features can optionally be included in any feasible combination. The first plurality of input samples may be further identified by at least determining a probability density function (PDF) associated with the first activation map. The probability density function of the first activation map may indicate a probability of a value being output by the plurality of neurons forming the first hidden layer of the first machine learning model.

In some variations, the second digital watermark may be extracted from the second machine learning model by at least processing, with the second machine learning model, the first plurality of input samples corresponding to the first digital watermark.

In some variations, the comparison of the first digital watermark and the second digital watermark may include determining a bit error rate (BER) between the first digital watermark and the second digital watermark. The second machine learning model may be determined to be a duplicate of the first machine learning model based at least on the bit error rate not exceeding a threshold value.

In some variations, whether the first plurality of input samples triggers, in the second activation map, a same and/or similar changes as in the first activation map may be determined based at least on a second activation map associated with the second machine learning model. The second machine learning model may be a duplicate of the first machine learning model if the plurality input samples triggers the same or similar changes in the second activation map as in the first activation map.

In some variations, the training of the first machine learning model may include minimizing an error in an output of the first machine learning model by at least minimizing a loss function. The loss function may include a loss term characterizing a distribution of values output by the neurons included in the first hidden layer of the first machine learning model. The loss term may be minimized, during the training of the first machine learning model, to at least maximize an isolation between clusters of values output by the neurons included in the first hidden layer of the first machine learning model. The loss function may further include a loss term characterizing a distance between the first digital watermark and a digital watermark present in the first machine learning model. The loss term may be minimized, during the training of the first machine learning model, to at least minimize a difference between the first digital watermark and the digital watermark present in the first machine learning model.

In some variations, the first plurality of input samples may be further identified, based at least on a second activation map associated with a second hidden layer of the first machine learning model, to alter one or more low probabilistic regions of the second activation map.

In some variations, a second plurality of input samples originating from one or more low density regions of the first machine learning model may be identified. The one or more low density regions may be occupied by input samples rarely encountered by the first machine learning model. A second digital watermark may be embedded in an output layer of the first machine learning model by at least fine-tuning, based at least on the second plurality of input samples, the first machine learning model. The second plurality of input samples may be further identified based at least on the second plurality of input samples altering the one or more low probabilistic regions of the first activation map. The identifying of the second plurality of input samples may include excluding, from the second plurality of input samples, one or more input samples that cannot be correctly classified by the first machine learning model. The fine-tuning of the first machine learning model may include retraining, subsequent to training the first machine learning model, the first machine learning model to assign, with an above-threshold certainty, a label to each of the second plurality of input samples. A randomly selected label corresponding to a ground-truth label for each of the second plurality of input samples may be assigned to each of the second plurality of input samples. The second machine learning model may be determined to be a duplicate of the first machine learning model based at least on a probability of the second machine learning model assigning a correct label to each of the second plurality of input samples.

In some variations, the first digital watermark may be embedded in a first copy of the first machine learning model distributed to a first client. A third digital watermark may be embedded in a second copy of the first machine learning model distributed to a second client. The first client may be determined to be a source of the second machine learning model based at least on the second digital watermark extracted from the second machine learning model matching first digital watermark embedded in the first copy of the first machine learning model.

In some variations, the first machine learning model and/or the second machine learning model may be a neural network.

In another aspect, there is provided a method for embedding a digital watermark in a machine learning model. The method may include: identifying, based at least on a first activation map associated with a first hidden layer of a first machine learning model, a first plurality of input samples altering one or more low probabilistic regions of the first activation map, the first hidden layer including a plurality of neurons, each of the plurality of neurons applying an activation function to generate an output, and the one or more low probabilistic regions of the first activation map being occupied by values having a below threshold probability of being output by the plurality of neurons; embedding, in the first hidden layer of the first machine learning model, a first digital watermark corresponding to the first plurality of input samples, the embedding of the first digital watermark includes training, based at least on training data including the first plurality of input samples, the first machine learning model; and determining that a second machine learning model is a duplicate of the first machine learning model based at least on a comparison of the first digital watermark embedded in the first machine learning model and a second digital watermark extracted from the second machine learning model.

In some variations, one or more features disclosed herein including the following features can optionally be included in any feasible combination. The first plurality of input samples may be further identified by at least determining a probability density function (PDF) associated with the first activation map. The probability density function of the first activation map may indicate a probability of a value being output by the plurality of neurons forming the first hidden layer of the first machine learning model.

In some variations, the method may further include extracting, from the second machine learning model, the second digital watermark by at least processing, with the second machine learning model, the first plurality of input samples corresponding to the first digital watermark.

In some variations, the comparison of the first digital watermark and the second digital watermark may include determining a bit error rate (BER) between the first digital watermark and the second digital watermark. The second machine learning model may be determined to be a duplicate of the first machine learning model based at least on the bit error rate not exceeding a threshold value.

In some variations, the method may further include determining, based at least on a second activation map associated with the second machine learning model, whether the first plurality of input samples triggers, in the second activation map, a same and/or similar changes as in the first activation map, the second machine learning model being a duplicate of the first machine learning model if the plurality input samples triggers the same or similar changes in the second activation map as in the first activation map.

In some variations, the training of the first machine learning model may include minimizing an error in an output of the first machine learning model by at least minimizing a loss function. The loss function may include a loss term characterizing a distribution of values output by the neurons included in the first hidden layer of the first machine learning model. The loss term may be minimized, during the training of the first machine learning model, to at least maximize an isolation between clusters of values output by the neurons included in the first hidden layer of the first machine learning model. The loss function may further include a loss term characterizing a distance between the first digital watermark and a digital watermark present in the first machine learning model. The loss term may be minimized, during the training of the first machine learning model, to at least minimize a difference between the first digital watermark and the digital watermark present in the first machine learning model.

In some variations, the first plurality of input samples may be further identified, based at least on a second activation map associated with a second hidden layer of the first machine learning model, to alter one or more low probabilistic regions of the second activation map.

In some variations, the method may further include: identifying a second plurality of input samples originating from one or more low density regions of the first machine learning model, the one or more low density regions being occupied by input samples rarely encountered by the first machine learning model; and embedding, in an output layer of the first machine learning model, a second digital watermark by at least fine-tuning, based at least on the second plurality of input samples, the first machine learning model. The second plurality of input samples may be further identified based at least on the second plurality of input samples altering the one or more low probabilistic regions of the first activation map. The identifying of the second plurality of input samples may include excluding, from the second plurality of input samples, one or more input samples that cannot be correctly classified by the first machine learning model. The fine-tuning of the first machine learning model may include retraining, subsequent to training the first machine learning model, the first machine learning model to assign, with an above-threshold certainty, a label to each of the second plurality of input samples. A randomly selected label corresponding to a ground-truth label for each of the second plurality of input samples may be assigned to each of the second plurality of input samples. The second machine learning model may be determined to be a duplicate of the first machine learning model based at least on a probability of the second machine learning model assigning a correct label to each of the second plurality of input samples.

In some variations, the first digital watermark may be embedded in a first copy of the first machine learning model distributed to a first client. A third digital watermark may be embedded in a second copy of the first machine learning model distributed to a second client. The method may further include determining that the first client is a source of the second machine learning model based at least on the second digital watermark extracted from the second machine learning model matching first digital watermark embedded in the first copy of the first machine learning model.

In some variations, the first machine learning model and/or the second machine learning model may be a neural network.

In another aspect, there is provided a computer program product that includes a non-transitory computer readable storage medium. The non-transitory computer-readable storage medium may include program code that causes operations when executed by at least one data processor. The operations may include: identifying, based at least on a first activation map associated with a first hidden layer of a first machine learning model, a first plurality of input samples altering one or more low probabilistic regions of the first activation map, the first hidden layer including a plurality of neurons, each of the plurality of neurons applying an activation function to generate an output, and the one or more low probabilistic regions of the first activation map being occupied by values having a below threshold probability of being output by the plurality of neurons; embedding, in the first hidden layer of the first machine learning model, a first digital watermark corresponding to the first plurality of input samples, the embedding of the first digital watermark includes training, based at least on training data including the first plurality of input samples, the first machine learning model; and determining that a second machine learning model is a duplicate of the first machine learning model based at least on a comparison of the first digital watermark embedded in the first machine learning model and a second digital watermark extracted from the second machine learning model.

In another aspect, there is provided an apparatus for embedding a digital watermark in a machine learning model. The apparatus may include: means for identifying, based at least on a first activation map associated with a first hidden layer of a first machine learning model, a first plurality of input samples altering one or more low probabilistic regions of the first activation map, the first hidden layer including a plurality of neurons, each of the plurality of neurons applying an activation function to generate an output, and the one or more low probabilistic regions of the first activation map being occupied by values having a below threshold probability of being output by the plurality of neurons; means for embedding, in the first hidden layer of the first machine learning model, a first digital watermark corresponding to the first plurality of input samples, the embedding of the first digital watermark includes training, based at least on training data including the first plurality of input samples, the first machine learning model; and means for determining that a second machine learning model is a duplicate of the first machine learning model based at least on a comparison of the first digital watermark embedded in the first machine learning model and a second digital watermark extracted from the second machine learning model.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
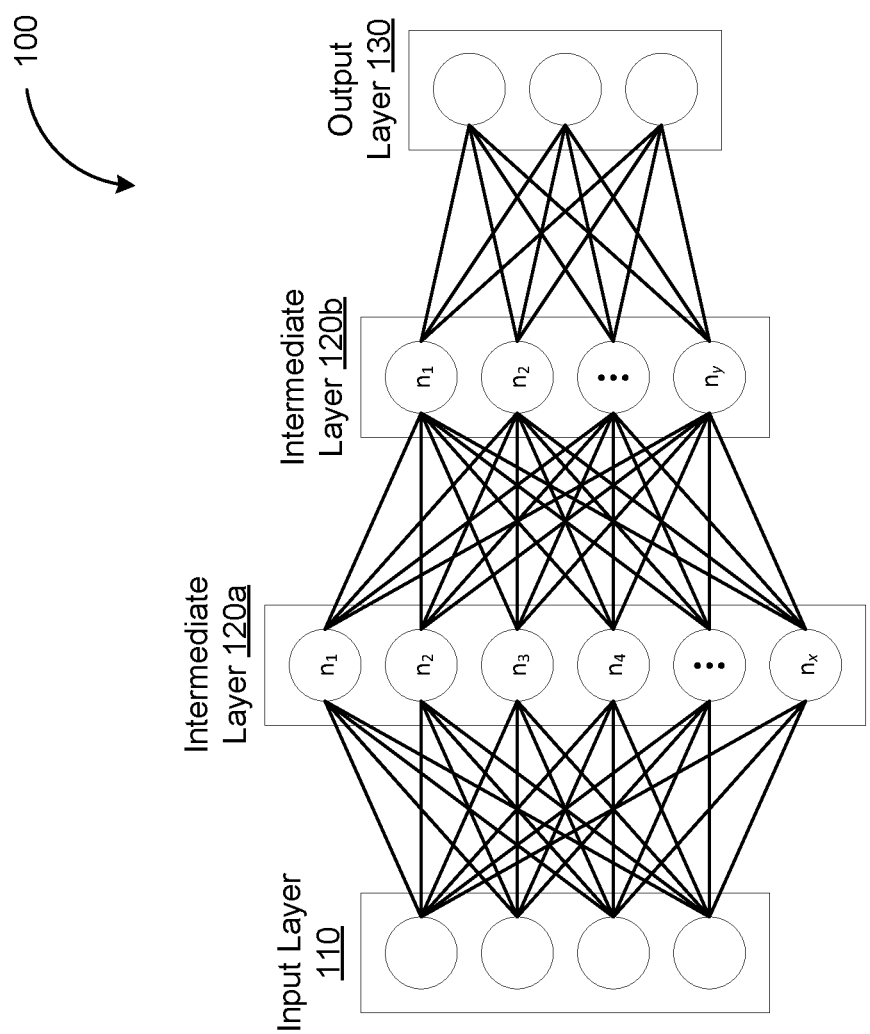
FIG. 1 depicts a schematic diagram illustrating an example of a machine learning model, in accordance with some example embodiments.

Machine learning models may be trained to perform a variety of cognitive tasks including, for example, classification, regression, feature extraction, pattern recognition, and/or the like. Training an accurate machine learning model may require investing substantial resources, for example, to generate a comprehensive collection of labeled data as well as to fine tune the underlying model topology (e.g., type and/or quantity of hidden layers), hyperparameters (e.g., learning rate, batch size, and/or the like), and weights. Nevertheless, a conventional machine learning model may be deployed and/or distributed for use without any indicia of ownership to enable the detection, tracking, and/or prevention of misuse by third parties. Accordingly, in some example embodiments, a digital watermark uniquely identifying a machine learning model may be embedded in the machine learning model. The presence of the digital watermark may enable the owner of the machine learning model to determine whether the machine learning model and/or the proprietary training data used to generate the machine learning model are being misused by a third party.

In some example embodiments, the machine learning model may be a neural network having a plurality of layers including, for example, core computation layers, normalization layers, pooling layers, non-linearity layers, and/or the like. As part of processing an input sample (e.g., training data, validation data, testing data, and/or the like), the intermediate layers and the output layer of the machine learning model may apply, to values received from a preceding layer, one or more activation functions. The results of the applying the one or more activation functions may be provided as output data from the machine learning model and/or passed onto a subsequent layer of the machine learning model for further processing. Accordingly, the activation maps associated with a layer of the machine learning model may enumerate the different values output by the one or more activation functions in the layer. The activation maps may be associated with a probability density function (PDF) providing, for various value, a probability of the value being output by each of the one or more activation functions in the layer.

In some example embodiments, the digital watermark embedded in the machine learning model may be a binary string that is embedded into the activation maps associated with one or more layers of the machine learning model such as, for example, the intermediate layers and/or the output layer of the machine learning model. Embedding the digital watermark in the machine learning model may include training the machine learning model using the training data that includes a subset of training data configured to alter the activation maps associated with one or more layers of the machine learning model. The samples included in this subset of training data may correspond to the watermarking keys that the owner of the machine learning model may subsequently use to extract the digital watermark from the machine learning model. In order to avoid diminishing the overall accuracy of the machine learning model, embedding the digital watermark may include learning the probability density function associated with each activation map such that the subset of training data is configured to alter only the low probabilistic regions of the activation maps. The low probabilistic regions of an activation map may be occupied by values having a low probability of being output by the one or more activation functions included in the corresponding layer of the machine learning model.

In some example embodiments, the digital watermark embedded in the machine learning model may be a signature that uniquely identifies the machine learning model. As such, the owner of the machine learning model may determine that the machine learning model and/or the proprietary training data used to generate the machine learning model are being misused by a third party if the same and/or similar digital watermark is present in a machine learning model associated with the third party. For example, the digital watermark may be extracted from the machine learning model associated with the third party to determine that the machine learning model associated with the third party is trained using proprietary training data. The digital watermark may be extracted from the machine learning model associated with the third party by at least processing, with that machine learning model associated with the third party, the subset of training data corresponding to the watermarking keys. For instance, if the machine learning model associated with the third party is trained using proprietary training data, the extracted digital watermark may match the embedded digital watermark. That is, the machine learning model associated with the third party may be trained with proprietary training data if the subset of training data corresponding to the watermarking keys triggers the same changes in the activation maps associated with one or more layers of the machine learning model associated with the third party.

In some example embodiments, the digital watermark may be embedded in and extracted from the hidden layers of the machine learning model in a white-box setting in which the activation maps associated with the hidden layers of the machine learning model are available for analysis. Alternatively, the digital watermark may be embedded in and extracted from the output layer of the machine learning model in a black-box setting in which the activation maps associated with the hidden layers of the machine learning model are unavailable for analysis. In the black-box setting, the presence of the digital watermark in the third party machine learning model may be determined based on the output of the third-party machine learning model instead of the activation maps associated with the hidden layers of third party machine learning model.

In some example embodiments, different digital watermarks may be embedded in the machine learning model distributed to different parties in order to track the machine learning model in the event a misuse of the machine learning model is detected. For example, a first digital watermark may be embedded in the machine learning model distributed to a first party while a second digital watermark may be embedded in the same machine learning model distributed to a second party. The first digital watermark and the second digital watermark may serve as fingerprints that uniquely identify the machine learning model distributed to the first party and the machine learning model distributed to the second party. Accordingly, the digital watermark that is extracted from a misused machine learning model may be compared against the first digital watermark and the second digital watermark to at least identify the first party or the second party as being the source of the misused machine learning model.

FIG. 1 depicts a schematic diagram illustrating an example of a machine learning model 100, in accordance with some example embodiments. Referring to FIG. 1, the machine learning model 100 may be a deep learning model such as, for example, a neural network and/or the like. Furthermore, as shown in FIG. 1, the machine learning model 100 may be trained to perform a classification task in which the machine learning model 100 processes an input sample and outputs a probability vector that includes a probability of the input sample being a member of each of a plurality of classes.

Referring again to FIG. 1, the machine learning model 100 may include a plurality of layers including, for example, an input layer 110, a first intermediate layer 120a, a second intermediate layer 120b, and an output layer 130. Each of the first intermediate layer 120a and/or the second intermediate layer 120b may be implemented as a core computation layer, normalization layer, pooling layer, non-linear layer, and/or the like. The first intermediate layer 120a and the second intermediate layer 120b may be the hidden layers of the machine learning model 100. It should be appreciated that the machine learning model 100 may include a different quantity of hidden layers than shown in FIG. 1. Table 1 below depicts examples of core computation layers, normalization layers, pooling layers, and non-linear layers that may be present in the machine learning model 100, for example, as the first intermediate layer 120a and/or the second intermediate layer 120b.

TABLE 1

| DL Layers | | Description |
|---|---|---|
| Core Computations | Fully-Connected | $x_i^{(l)} = \sum_{j=1}^{N_{l-1}} \theta_{ij}^{(l-1)} \times z_j^{(l-1)}$ |
| | 2D Convolution | $x_{ij}^{(l)} = \sum_{s_1=1}^{k} \sum_{s_2=1}^{k} \theta_{s_1 s_2}^{(l-1)} \times z_{(i+s_1)(j+s_2)}^{l-1}$ |
| Normalization | $L_2$ Normalization | $x_i^{(l)} = \dfrac{x_i^{(l)}}{\sqrt{\sum_{j=1}^{N_l} |x_j^{(l)}|^2}}$ |
| | Batch Normalization | $x_i^{(l)} = \dfrac{x_i^{(l)} - \mu_B^{(l)}}{\sqrt{\dfrac{1}{b_s}\sum_{j=1}^{b_s}(x_j^{(l)} - \mu_B^{(l)})^2}}$ |
| Pooling | 2D Max Pooling | $x_{ij}^{(l)} = \text{Max}(y_{(i+s_1)(j+s_2)}^{l-1})$ $s_1 \in \{1, 2, \ldots, k\}$, $s_2 \in \{1, 2, \ldots, k\}$ |
| | 2D Mean Pooling | $x_{ij}^{(l)} = \text{Mean}(z_{(i+s_1)(j+s_2)}^{l-1})$ $s_1 \in \{1, 2, \ldots, k\}$, $s_2 \in \{1, 2, \ldots, k\}$ |
| Non-linearities | Softmax | $z_i^{(l)} = \dfrac{e^{x_i^{(l)}}}{\sum_{i=1}^{N_l} e^{x_j^{(l)}}}$ |
| | Sigmoid | $z_i^{(l)} = \dfrac{1}{1 + e^{-x_i^{(l)}}}$ |
| | Tangent Hyperbolic | $z_i^{(l)} = \dfrac{\text{Sin}h(x_i^{(l)})}{\text{Cos}h(x_i^{(l)})}$ |
| | Rectified Linear unit | $z_i^{(l)} = \text{Max}(0, x_i^{(l)})$ |

The input layer 110, the first intermediate layer 120a, the second intermediate layer 120b, and the output layer 130 may each include a plurality of neurons. For example, as shown in FIG. 1, the first intermediate layer 120a may include an x quantity of neurons (e.g., as depicted by the circles labeled $n_1$, $n_2$, $n_3$, $n_4$, ..., $n_x$ in FIG. 1) while the second intermediate layer 120b may include a y quantity of neurons (e.g., as depicted by the circles labeled $n_1$, $n_2$, ..., $n_y$ in FIG. 1). As shown in FIG. 1, the neurons in each layer of the machine learning model 100 may be interconnected with neurons in a preceding layer of the machine learning model 100 and/or a subsequent layer of the machine learning model 100. For instance, each of the x quantity of neurons in the first intermediate layer 120a may be interconnected to one or more neurons in the input layer 110 as well as one or more neurons in the second intermediate layer 120b. Meanwhile, each of the y quantity of neurons in the second intermediate layer 120b may be interconnected to one or more neurons in the first intermediate layer 120a and one or more neurons in the output layer 130.

In some example embodiments, the neurons in each of the input layer 110, the first intermediate layer 120a, the second intermediate layer 120b, and the output layer 130 may be configured to apply, to one or more input values, an activation function including, for example, for example, a sigmoid function, a hyperbolic function, a rectified linear unit (ReLU) function, a maximum function, an exponential linear unit (ELU) function, and/or the like. For instance, referring again to FIG. 1, each of the x quantity of neurons in the first intermediate layer 120a may apply an activation function to a weighted sum of the one or more input values received from the neurons in the input layer 110. The results the x quantity of neurons in the first intermediate layer 120a applying the activation function may be passed to the second intermediate layer 120b where the results are weighted and summed before each of the y quantity of neurons in the second intermediate layer 120b applies another activation function.

Figure 2:
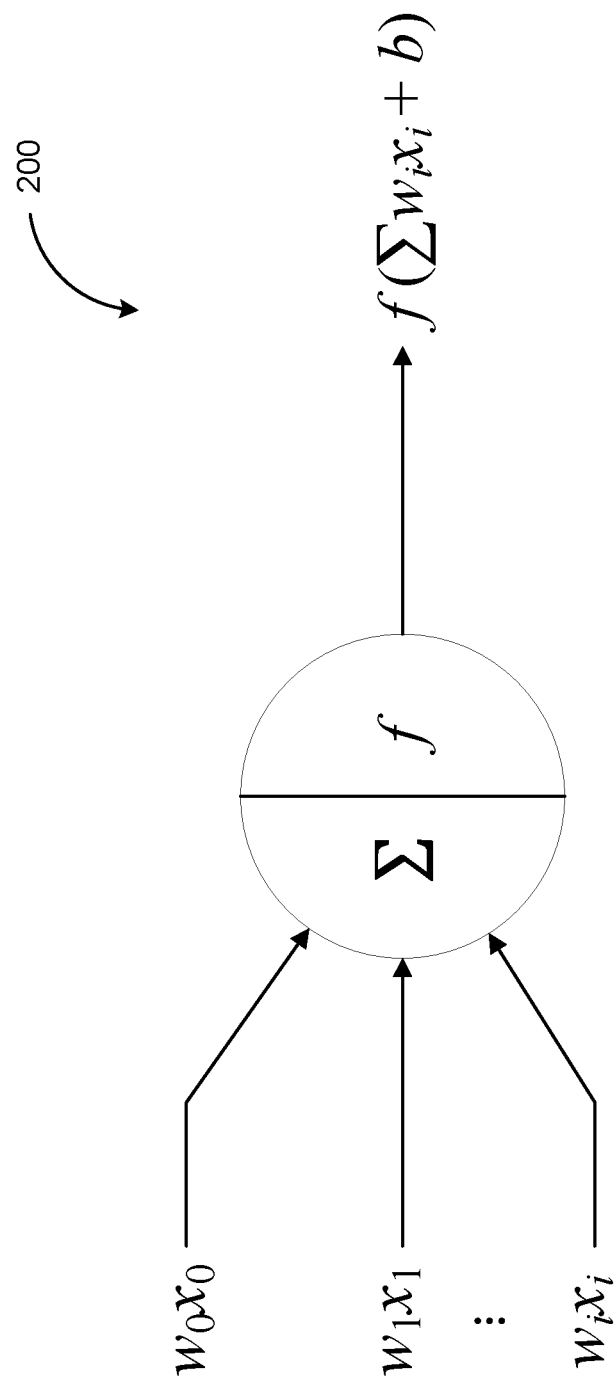
FIG. 2 depicts an example of a neuron, in accordance with some example embodiments.

To further illustrate, FIG. 2 depicts an example of a neuron 200, in accordance with some example embodiments. Referring to FIGS. 1-2, the neuron 200 may implement one or more of the neurons included in the input layer 110, the first intermediate layer 120a, the second intermediate layer 120b, and/or the output layer 130. As shown in FIG. 2, the neuron 200 may receive, as part of an input sample of the machine learning model 100 or from a preceding layer of the machine learning model 100, an i quantity of input values (e.g., $x_1$, $x_2$, ..., $x_i$). A corresponding weight (e.g., $w_1$, $w_2$, ..., $w_i$) may be applied to each of the i quantity of input values (e.g., $x_1$, $x_2$, ..., $x_i$) and a bias b may be added before the neuron 200 applies an activation function $f$ to the weighted sum. It should be appreciated that the activation function $f$ may be any type of activation function including, for example, a sigmoid function, a hyperbolic function, a rectified linear unit (ReLU) function, a maximum function, an exponential linear unit (ELU) function, and/or the like. The result of applying the activation function $f$ (e.g., $f(\Sigma_i w_i x_i + b)$) may be part of the output data of the machine learning model 100 or passed to a subsequent layer in the machine learning model 100 for further processing. It should be appreciated that the values of the weights (e.g., $w_1$, $w_2$, ..., $w_i$) and the bias b may be determined as part of training the machine learning model 100. For example, the values of the weights (e.g., $w_1$, $w_2$, ..., $w_i$) and the bias b may be adjusted during the training of the machine learning model 100 to minimize an error in the output of the machine learning model 100.

As noted, the machine learning model 100 may be trained to perform a classification task in which the machine learning model 100 determines whether an input sample is a member of one or more of an S quantity of classes (e.g., $c_1$, $c_2$, ..., $c_s$). For instance, in some example embodiments, the output layer 130 may be configured to normalize the output from the preceding layers of the machine learning model 100 into a probability distribution on the S quantity of classes. That is, the machine learning model 100 may output, for example, at the output layer 130, a probability vector (e.g., $[p_1, p_2, \ldots, p_S]$) that includes, for each of the S quantity of classes, a corresponding probability $p_S$ of the input sample being a member of the class. For example, for a first class $c_1$ and a second class $c_2$, the machine learning model 100 may determine and output a first probability $p_1$ of the input sample being a member of the first class $c_1$ and a second probability $p_2$ of the input sample being a member of the second class $c_2$.

The machine learning model 100 may be susceptible to misuse by a third party when the machine learning model 100 is deployed and/or distributed for use, for example, to a first client 350a, a second client 350b, and/or the like. For example, the third party may deploy the machine learning model 100 without any authorization from the owner of the machine learning model 100. Alternatively and/or additionally, the third party may train, without permission from the owner of the machine learning model 100, a separate machine learning model using the same proprietary training data used to generate the machine learning model 100. Accordingly, in some example embodiments, a digital watermark may be embedded in the machine learning model 100 to enable the detection, tracking, and/or prevention of misuse by third parties. For example, the digital watermark may be inserted into the input layer 110, the first intermediate layer 120a, the second intermediate layer 120b, and/or the output layer 130. The digital watermark may serve as a signature that uniquely identifies the machine learning model 100 and/or the proprietary training data used to generate the machine learning model 100.

Figure 3:
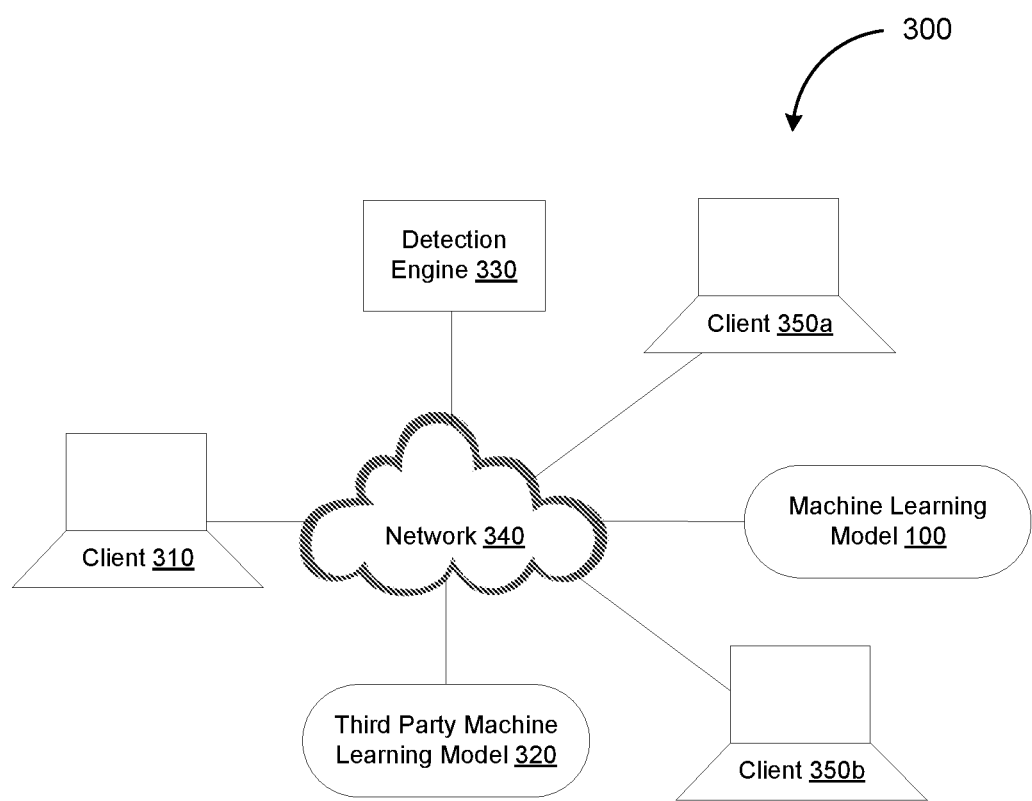
FIG. 3 depicts a system diagram illustrating a misuse detection system, in accordance with some example embodiments.

FIG. 3 depicts a system diagram illustrating an example of a misuse detection system 300, in accordance with some example embodiments. Referring to FIGS. 1-3, a client 310 associated with an owner of the machine learning model 100 may determine whether the machine learning model 100 has been deployed, without authorization, as a third party machine learning model 320. Alternatively and/or additionally, the client 300 may determine whether the third party machine learning model 320 has been trained using the same proprietary training data used to train the machine learning model 100.

In some example embodiments, the misuse detection system 300 may include a detection engine 330 configured to generate and embed, in the machine learning model 100, a digital watermark uniquely identifying the machine learning model 100. The detection engine 330 may be further be configured to extract, from the third party machine learning model 320, a digital watermark and/or determine whether the digital watermark extracted from the third party machine learning model 320 matches the digital watermark embedded in the machine learning model 100. As shown in FIG. 3, the detection engine 330 may be communicatively coupled to the client 310 via a wired and/or wireless network 340 including, for example, a wide area network (WAN), a local area network (LAN), a virtual local area network (VLAN), a public land mobile network (PLMN), the Internet, and/or the like. Accordingly, the detection engine 330 may embed the digital watermark in the machine learning model 100 and/or extract the digital watermark from the third party machine learning model 320 in response to one or more requests from the client 310.

In some example embodiments, the client 310 associated with the owner of the machine learning model 100 may embed a first digital watermark in a copy of the machine learning model 100 distributed to a first client 350a and a second digital watermark in a copy of the machine learning model 100 distributed to a second client 350b. The first digital watermark and the second digital watermark may serve as fingerprints that uniquely identify the copy of the machine learning model 100 distributed to the first client 350a and the copy of the machine learning model distributed to the second party. As such, if the detection engine 330 extracts the first digital watermark from the third party machine learning model 320 instead of the second digital watermark, the detection engine 330 may determine that the first client 350a is the source of the third party machine learning model 320 that misuses the machine learning model 100.

In some example embodiments, the digital watermark embedded in the machine learning model 100 may be an N-bit (N≥1) binary string defined by an owner of the machine learning model 100 and embedded into the activation maps associated with the input layer 110, the first intermediate layer 120a, the second intermediate layer 120b, and/or the output layer 130 of the machine learning model 100. Embedding the digital watermark in the machine learning model 100 may include training the machine learning model 100 using the training data that includes a subset of training data (e.g., 1% or a different portion of the training data) configured to alter the activation maps associated with the input layer 110, the first intermediate layer 120a, the second intermediate layer 120b, and/or the output layer 130 of the machine learning model 100. The samples included in this subset of training data may correspond to the watermarking keys that the owner of the machine learning model 100 may subsequently use to extract the digital watermark from the machine learning model 100. For example, these samples may trigger the same activations in the input layer 110, the first intermediate layer 120a, the second intermediate layer 120b, and/or the output layer 130 of the machine learning model 100.

Referring to FIGS. 1-2, each layer of the machine learning model 100 may include neurons configured to apply an activation function to a weighted sum of the one or more input values received from a preceding layer of the machine learning model 100 or as part of an input sample of the machine learning model 100. The activation map associated with a layer of the machine learning model 100 may enumerate the different output values of the activation functions applied by the neurons forming that layer of the machine learning model 100. For instance, referring to FIGS. 1-2, the activation map associated with the first intermediate layer 120a may enumerate the output values (e.g., $f(\Sigma_i w_i x_i + b)$ and/or the like) of the activation functions applied by each of the x quantity of neurons in the first intermediate layer 120a. In order to avoid diminishing the overall accuracy of the machine learning model 100, embedding the digital watermark may include learning the probability density function (PDF) associated with each activation map such that the subset of training data is configured to alter only the low probabilistic regions of the activation maps. The low probabilistic regions of an activation map may be occupied by values having a low probability of being output by the one or more activation functions included in the corresponding layer of the machine learning model 100. That is, the subset of training data may be generated to include samples that cause the activation functions in the corresponding layer of the machine learning model 100 to output values that are otherwise not output and/or infrequently output by the activation functions. As such, if the third party machine learning model 320 is a duplicate of the machine learning model 100, the one or more activation functions in the corresponding layers of the machine learning model 100 may output the same values when the third party machine learning model 320 processes the subset of training data used to digitally watermark the machine learning model 100.

In some example embodiments, embedding the digital watermark in the machine learning model 100 may include generating a subset of training data capable of altering only the low probabilistic regions of the activation maps associated with the hidden layers (e.g., the input layer 110, the first intermediate layer 120a, and/or the second intermediate layer 120b) of the machine learning model 100. The data distribution (e.g., probability density function) associated with each hidden layer prior to the embedding of the digital watermark may be characterized as a Gaussian Mixture Model (GMM). Furthermore, embedding the digital watermark in the machine learning model 100 may include generating the subset of training data to include samples that adjust the tails of the decision boundaries between different classes. These adjustments may introduce, into the output layer 130, a statistical bias associated with the samples such that the machine learning model 100 is able to consistently assign these samples as high probability members of the corresponding classes.

In some example embodiments, embedding the digital watermark in a hidden layer l (e.g., the input layer 110, the first intermediate layer 120a, and/or the second intermediate layer 120b) of the machine learning model 100 may include randomly selecting one or more Gaussian distributions. For example, one or more Gaussian distributions may be selected by at least randomly selecting, with no replacement, one or more indices between 1 and S in which each index between 1 and S may correspond to one of the Gaussian distributions forming a target mixture model containing a total of S Gaussian distributions. That is, given a plurality of Gaussian classes (e.g., class 1, class 2, and/or the like), the subset of training data that is selected may be associated with ground-truth labels belonging to one or more of the Gaussian classes (e.g., select samples from class 1, class 2, and/or the like). It should be appreciated that the quantity S of Gaussian distributions forming the target mixture model may correspond to the quantity of classes to which the machine learning model 100 may assign an input sample. Moreover, the mean values of the randomly selected Gaussian distributions may be used to carry the digital watermark. That is, samples associated with these randomly selected Gaussian distributions may be used to form the subset of training data, which are configured to alter only the low probabilistic regions of the activation map associated with the hidden layer l. Each sample in this subset of training data may correspond to a portion of a watermarking key (e.g., $X^{key}$) that may be later used to extract the digital watermark.

A projection matrix A may be generated to encrypt, into binary space, the mean values of the randomly selected Gaussian distributions. The projection matrix A may be used to determine, during the training of the machine learning model 100, the progress of embedding the digital watermark (e.g., the N-bit binary string defined by the owner of the machine learning model 100). For instance, the projection matrix A may measure, during the training of the machine learning model 100, a difference between the digital watermark present in the machine learning model 100 and the N-bit binary string defined by the owner of the machine learning model 100. This projection may be performed in accordance with Equation (1) below:

$$G_\sigma^{s \times N} = \text{Sigmoid}(\mu_i^{s \times M} \cdot A^{M \times N}),$$

$$b^{s \times N} = \text{Hard\_Thresholding}(G_\sigma^{s \times N}, 0.5). \quad (1)$$

wherein M may denote the size of the feature space in the selected hidden layer l, s may denote the Gaussian distributions selected to carry the digital watermark, and N may denote the desired length of the digital watermark embedded at a mean value of the s selected Gaussian distributions ($\mu_i^{s \times M}$).

According to some example embodiments, a standard normal distribution (e.g., N (0,1)) may be used to generate the projection matrix A. Using independent and identically distributed samples drawn from a normal distribution may ensures that each bit of the N-bit binary string is embedded into all of the features associated with the selected centers. The $\sigma$ notation in Equation (1) may denote the deployment of a Sigmoid function configured to output a value between 0 and 1. Given the random nature of the N-bit binary string, the threshold in Equation (1) may be set to 0.5 to correspond to the expected value of Sigmoid function $\sigma$. The Hard_Thresholding function in Equation (1) may map the values in $G_\sigma$ that are greater than 0.5 to a value of 1 and the values in $G_\sigma$ that are less than 0.5 to a value of 0. The watermarking keys may therefore include the randomly selected Gaussian distributions s, trigger keys $X^{key}$, and projection matrix A.

Effectively embedding the digital watermark in the machine learning model 100 may impose additional constraints on the training of the machine learning model 100. For example, the low probabilistic regions of the activation maps altered by the subset of training data should be isolated from the other regions of the activation maps. Alternatively and/or additionally, a difference between the digital watermark present in the machine learning model 100 and the N-bit binary string defined by the owner of the machine learning model 100 should be minimized. To address these constraints, additional loss terms may be added to the loss function that is minimized during the training of the machine learning model 100 to minimize the error in the output of the machine learning model 100.

Equation (2) below expresses a first loss term $loss_1$ that accounts for the constraint to maximize the isolation between activations or clusters of outputs from the activation functions applied by the neuron in the hidden layer l. This first loss term $loss_1$ may be configured to penalize an activation distribution in which different activations (e.g., outputs from the activation functions applied by the neuron in the hidden layer l) are entangled and difficult to separate.

$$\underbrace{\lambda_1 \left( \Sigma_{i \in T} \|\mu_l^i - f_l^i(x, \theta)\|_2^2 - \Sigma_{i \in T, j \notin T} \|\mu_l^i - \mu_l^j\|_2^2 \right)}_{loss_1} \quad (2)$$

wherein $\lambda_1$ may denote a tradeoff hyper-parameter specifying the contribution of the first loss term $loss_1$ during the training of the machine learning model 100, $\theta$ may denote the parameters of the machine learning model 100 (e.g., weights, biases, and/or the like), $f_l^i(x, \theta)$ may denote the activation map corresponding to the input sample x belonging to class i at layer l of the machine learning model, T may denote the set of s target Gaussian classes selected to carry the digital watermark, and $\mu_l^i$ may denote the mean value of the $i^{th}$ Gaussian distribution at layer l of the machine learning model 100. Equation (2) may be configured to minimize the spreading (variance) of each Gaussian Mixture Model (GMM) class used to carry the digital watermarking while maximizing the distance between the activation centers belonging to different Gaussian classes. Moreover, Equation (2) may augment data features to better fit a Gaussian Mixture Model distribution. It should be appreciated that the mean values $\mu_i^i$ and intermediate activations $f_l^i(x, \theta)$ in Equation (2) may be trainable variables that may be iteratively fine-tuned using back-propagation.

To ensure the mean values of the selected Gaussian distributions are as close to the digital watermark after the embedding of the digital watermark, a second loss term $loss_2$ shown in Equation (3) below may be added to the loss function associated with the machine learning model 100 which, as noted, may be minimized during the training of the machine learning model 100. The second loss term $loss_2$ may characterize the distance between the digital watermark present in the machine learning model 100 and the N-bit binary string defined by the owner of the machine learning model 100.

$$\underbrace{\lambda_2 \sum_{j=1}^{N} \sum_{k=1}^{s} (b^{kj} \ln(G_\sigma^{kj}) + (1 - b^{kj}) \ln(1 - G_\sigma^{kj}))}_{loss_2} \quad (3)$$

wherein $\lambda_2$ may denote a hyper-parameter determining the contribution of the second loss term $loss_2$ during the training of the machine learning model 100. The second loss term $loss_2$ may correspond to a binary cross-entropy loss where the true bit $b^{kj}$ is determined based on the N-bit binary string defined by the owner of the machine learning model 100 while the prediction probability $G_\sigma^{kj}$ may correspond to the Sigmoid of the projected Gaussian centers set forth in Eq. (2). The process of computing the vector $G_\sigma$ may be differentiable. Accordingly, for a selected set of projection matrices A and the N-bit binary string defined by the owner of the machine learning model 100, the selected Gaussian centers (e.g., the mean values of the selected Gaussian distributions s) may be adjusted via back-propagation such that a distance (e.g., Hamming distance) between the binarized projected center b and the actual bit b forming the digital watermark is minimized.

The third party machine learning model 320 may be tested for misuse by at least extracting, from the hidden layers of the third party machine learning model 320, the digital watermark embedded in the hidden layers of the machine learning model 100. The digital watermark may be extracted from the hidden layers of the third party machine learning model 320 if the third party machine learning model 320 is presented in a white-box setting in which the hidden layers of the machine learning model 320 are not obscured such that the activation maps associated with the hidden layers of the third party machine learning model 320 are available for analysis.

For example, the third party machine learning model 320 may be an unauthorized deployment of the machine learning model 100 and/or be trained using the same proprietary training data used to train the machine learning model 100. In some example embodiments, a digital watermark may be extracted from the third party machine learning model 320 by processing, with the third party machine learning model 320, input samples corresponding to the trigger keys $X^{key}$. Whether the third party machine learning model 320 is a duplicate of the machine learning model 100 may be determined based on whether a bit error rate (BER) between the digital watermark embedded in the machine learning model 100 and the digital watermark extracted from the third party machine learning model 320 is below a threshold value. For instance, if the third party machine learning model 320 is a duplicate of the machine learning model 100, the input samples corresponding to the trigger keys $X^{key}$ may trigger the same or similar changes to the low probabilistic regions of the activation maps associated with the hidden layers of the third party machine learning model 320 and may therefore result in a lower bit rate error (BER) value.

In some example embodiments, the data movement required to embed the digital watermark in the machine learning model 100 may be minimized by integrating the first loss term $loss_1$ and/or the second loss term $loss_2$ into the tensor graph of the machine learning model 100 such that the gradients with respect to the mean values of the Gaussian Mixture Model (GMM) may be computed during regular back-propagation and all computations for embedding the digital watermark may be performed homogeneously on a processor (e.g., graphic processing unit (GPU) for image processing). Modeling the tensor graph associated with the digital watermark separately may significantly slow training of the machine learning model 100 because the corresponding activation maps may need to be completely dumped from the original tensor graph of the machine learning model 100 during the forward pass to compute the loss associated with the digital watermark and to update the parameters of the tensor graph associated with the digital watermark. By contrast, integrating the first loss term loss and/or the second loss term $loss_2$ into the tensor graph of the machine learning model 100 may enable a reuse of the activation values within the original tensor graph with minimal memory overhead.

In some example embodiments, one or more functionalities of the detection engine 330 (e.g., digital watermark embedding, digital watermark extraction, and/or the like) may be exposed via an application programming interface (API). For example, the detection engine 330 may include a library providing a customized activity regularizer configured to compute the first loss term $loss_1$ and/or the second loss term $loss_2$ computes before returning the total regularized loss value described in Equation (1). The library may further include functions (e.g., get_activation, extract_WM_from, and/or the like) that the client 310 may call to extract a digital watermark, for example, from the third party machine learning model 320. To further illustrate, pseudo programming code implementing the functions for embedding and extracting a digital watermark from the hidden layers of a machine learning model is depicted in Table 2 below.

TABLE 2 import DeepSigns
from DeepSigns import subsample_training_data
from DeepSigns import WM_activity_regularizer
from DeepSigns import get_activations
from DeepSigns import extract_WM_from_activations
from DeepSigns import compute_BER
from utils import create_marked_model
create WM trigger keys
$X^{key}$ = subsample_training_data (T,{$X^{train}$ ,$Y^{train}$ })
instantiate customized WM activity regularizer
WM_reg = WM_activity_regularizer ($\lambda_1,\lambda_2$,b,A)
model = create_marked_model(WM_reg, model topology)
embed WM by standard training of the marked model
model.fit( $X^{train}$ ,$Y^{train}$ )
extract WM from the activation maps and compute BER
$\mu_i^{s*M}$ = get_activations(model, $X^{key}$ ,l,T )
b = extract_WM_from_activations($\mu_i^{s*M}$ , A)
BER = compute_BER (b, b)

In some example embodiments, embedding a digital watermark in the machine learning model 100 may further include embedding the digital watermark in the output layer 130 of the machine learning model 100. It should be appreciated that the embedding of the digital watermark in the output layer 130 of the machine learning model 100 should minimally affect the accuracy of the machine learning model 100, for example, in assigning input samples to one or more corresponding classes. Accordingly, the digital watermark may be embedded in the output layer 130 of the machine learning model 100 without altering the activation maps associated with the output layer 130. Instead, the digital watermark may be embedded in the output layer 130 of the machine learning model 100 by at least generating input samples configured to adjust the tails of the decision boundaries between different classes.

As noted, these adjustments may introduce, into the output layer 130, a statistical bias associated with the input samples such that the machine learning model 100 is able to consistently assign these input samples as high probability members of the corresponding classes. That is, the digital watermark embedded in the output layer 130 of the machine learning model 100 may cause the machine learning model 100 to always determine, with an above threshold probability or certainty, that each of the input samples is a member of a corresponding class, even though the machine learning model 100 rarely encounters such input samples during actual training of the machine learning model 100.

The digital watermark may be embedded in the output layer 130 of the machine learning model 100 after the machine learning model 100 has completed training and the digital watermark has already been embedded in the hidden layers (e.g., the input layer 110, the first intermediate layer 120a, and the second intermediate layer 120b) of the machine learning model 100. For instance, once the machine learning model 100 has been trained to reach convergence and a digital watermark has been embedded in the hidden layers of the machine learning model 100, the machine learning model 100 may be retrained on samples that adjust the tails of the decision boundaries between different classes.

Figure 4:
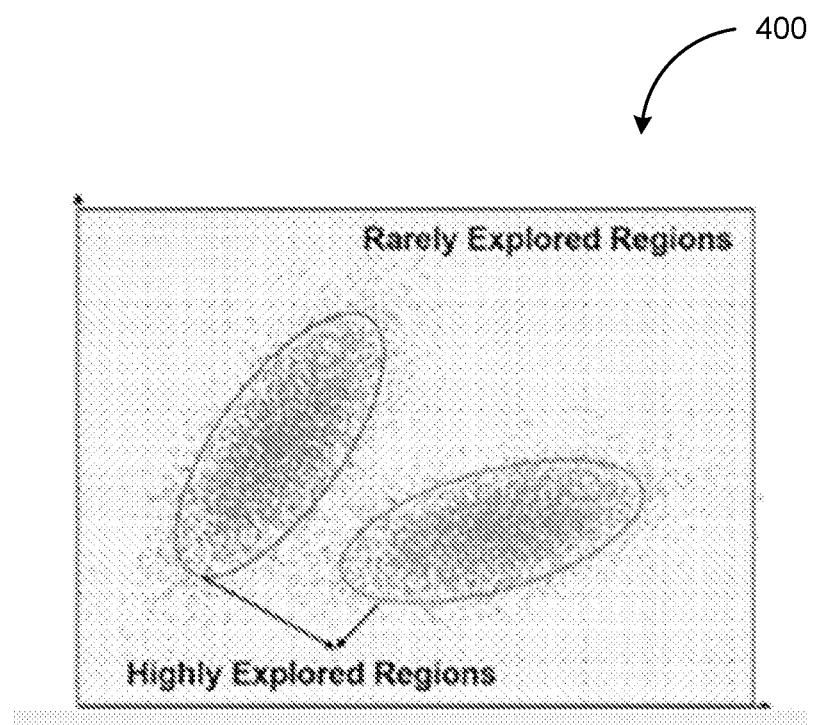
FIG. 4 depicts a graph illustrating the rarely explored regions and the highly explored regions of a machine learning model, in accordance with some example embodiments.

In some example embodiments, the watermarking keys associated with the output layer 130 may be selected to reside in low-density regions of the machine learning model 100 in order minimize the effects on the accuracy of the machine learning model 100. That is, the samples used to embed a digital watermark in the output layer 130 of the machine learning model 130 should originate from a rarely explored region of the machine learning model 100 occupied by subsets of input data infrequently encountered by the machine learning model 100, for example, during the training of the machine learning model 100. The rarely explored regions and/or the high explored regions of the machine learning model 100 may be determined based at least on the probability density function distribution associated with different layers of the machine learning model 100. To further illustrate, FIG. 4 depicts a graph 400 illustrating an example probability density distribution in which the input samples encountered by the machine learning model 100 are clustered into two highly explored regions surrounded by rarely explored regions.

In some example embodiments, embedding the digital watermark in the output layer 130 of the machine learning model 100 may include identifying a set of K unique and random input samples from the rarely explored regions of the machine learning model 100. Each the K quantity of random input sample may be passed through the pre-trained machine learning model 100 to verify that its intermediate activation lies within the rarely explored regions of the machine learning model 100. An input sample may be determined to originate from a rarely explored region of the machine learning model 100 if the quantity of activations within a Euclidian distance E of the activation corresponding to the input sample is less than a threshold value. Otherwise, a different random input sample may be generated to replace the input sample not originating from the rarely explored space of the machine learning model 100. A corresponding ground-truth vector may also be generated and assigned to each input key. For example, if the machine learning model 100 is trained to perform a classification task, then each of the K quantity of random input sample may be associated with a randomly selected label corresponding to the ground-truth classification of that random input sample.

The initial quantity of random input samples K' may be larger than the desired quantity of random input samples K (e.g., K'>K) in order to enable subsequent fine-tuning of the machine learning model 100. For instance, the trained machine learning model 100 may be fined tuned by at least processing, with the trained machine learning model 100, a mixture of random input samples from the K' quantity of random input samples and a subset of the original training data used to train the machine learning model 100. The fine-tuning of the trained machine learning model 100 may include retraining the trained machine learning model such that the machine learning model 100 is able to assign, with an above threshold certainty (e.g., probability of greater than 99%), at least some of the K' quantity of the random input samples a corresponding label and/or to a corresponding class.

In some example embodiments, once the fine-tuning of the trained machine learning model 100 is complete, the watermarking keys associated with the output layer 130 may be determined by at least identifying and removing, from the K' quantity of random input samples, those random input samples that trigger false positives and/or false negatives. For example, a random input sample may trigger a false negative (e.g., failing to identify the machine learning model 100) if the random input sample cannot be correctly classified by the machine learning model 100. Alternatively, a random input sample may trigger a false positive if the random input sample is correctly classified by a machine learning model different than the machine learning model 100 (e.g., a machine learning model not trained using the same proprietary training data as the machine learning model 100). It should be appreciated that each random input sample in the final set of K unique random input samples should be classified correctly by the machine learning model 100 but not classified correctly by a different machine learning model. Accordingly, the watermarking keys associated with the output layer 130 may include the K quantity unique random input samples that triggers neither false positives nor false negatives.

To further illustrate, Table 2 below depicts pseudo programming code implementing the embedding of a digital watermark in the output layer 130 of the machine learning model 100.

---

Algorithm 2 Watermark embedding for DL output layer.

---

INPUT: Topology of the partially-marked or unmarked
DNN ($\mathcal{T}$) and its pdf distribution (pdf); Training
Data ($\{X^{train}, Y^{train}\}$); Key size (K).

-continued

Algorithm 2 Watermark embedding for DL output layer.

OUTPUT: WATERMARKED DNN ($\mathcal{T}^*$); Crafted WM keys ( $\{X^{key'}, Y^{key'}\}$).
 1

Key Generation 1:
  Set the initial key size K' > K(e.g., K' = 20 × K).
  $\{X^{key'}, Y^{key'}\}$ ← Generate_Key_Pairs (K', pdf)
 2

Model Fine-tuning:
  $\mathcal{T}^*$ ← Train ($\mathcal{T}, \{X^{key'}, Y^{key'}\}, \{X^{train}, Y^{train}\}$)
 3

Key Generation 2:
  $Y_{\mathcal{T}^*}^{pred'}$ ← Predict ($\mathcal{T}^*, X^{key'}$)
  $Y_{\mathcal{T}}^{pred'}$ ← Predict ($\mathcal{T}, X^{key'}$)
  $I_{\mathcal{T}}$ ← Find_Match_Index ($Y^{key'}, Y_{\mathcal{T}^*}^{pred'}$)
  $I_{\mathcal{T}}$ ← Find_Mismatch_Index ($Y^{key'}, Y_{\mathcal{T}}^{pred'}$)
  $I^{key'}$ ← Find_Intersection ($I_{\mathcal{T}}, I_{\mathcal{T}}\cdot$)
  $\{X^{key}, Y^{key}\}$ ← Select ($\{X^{key'}, Y^{key'}\}, I^{key'}, K$)
Return: Marked DNN $\mathcal{T}^*$; WM key $\{X^{key}, Y^{key}\}$.

A third party machine learning model 320 may be tested for misuse by at least extracting, from the output layer of the third party machine learning model 320, the digital watermark embedded in the output layer of the machine learning model 100. In some example embodiments, the digital watermark may be extracted from the output layer of the third party machine learning model 320 instead of the hidden layers of the third party machine learning model 320 when the third party machine learning model 320 is presented in a black-box setting in which the hidden layers of the third party machine learning model 320 are obscured such that the activation maps associated with the hidden layers of the third party machine learning model 320 are unavailable for analysis.

In some example embodiments, the outputs of the third party machine learning model 320 in response to the each of the K quantity of random input samples corresponding to the watermarking keys may be used to determine whether the digital watermark embedded in the output layer 130 of the machine learning model 100 is present in the output layer of the third party machine learning model 320. For example, the presence of the digital watermark in the third party machine learning model 320 may be determined based on the quantity of mismatches between the outputs from the third party machine learning model 320 and the ground-truth labels assigned to each of the K quantity of random input samples.

If the third party machine learning model 320 is a duplicate of the machine learning model 100, there should be zero mismatches between the outputs from the third party machine learning model 320 and the ground-truth labels assigned to each of the K quantity of random input samples. Nevertheless, a higher threshold than zero should be used when determining the presence of the digital watermark in the third party machine learning model 320 because the third party machine learning model 320 are likely exhibit malicious and/or non-malicious modifications (e.g., model fine-tuning, model pruning, watermark overwriting, and/or the like) such that the third party machine learning model 320 may not always be an exact duplicate of the machine learning model 100.

For example, when the third party machine learning model 320 is queried using a random input sample (e.g., a random image and/or the like), the output from the third party machine learning model 320 may be associated with the probabilities $P(y^{pred}=j)=p_j$ in which $\Sigma_{j=1}^{S} p_j=1$ and S may denote the quantity of classes (e.g., $c_1, c_2, \ldots, c_S$) to which the random input sample may be determined to a member of Since the ground-truth label assigned to the random input sample is uniformly and randomly generated, the probability that the random input sample is correctly classified by the third party machine learning model 320 is expressed by Equation (5) below:

$$P(y^{pred} = y^{key}) = \sum_{j=1}^{S} P(y^{pred} = j, y^{key} = j) \quad (5)$$

$$= \sum_{j=1}^{S} P(y^{pred} = j) \times \sum_{j=1}^{S} P(y^{key} = j)$$

$$= \frac{1}{S} \times \sum_{j=1}^{S} P(y^{key} = j) = \frac{1}{S}$$

due to the independence between $P(y^{pred})$ and $p(y^{key})$. Note that Equation (5) also holds when class sizes are unbalanced. Accordingly, the probability of an arbitrary third party machine learning model 320 making at least $n_k$ correct classifications of the K quantity of random input samples may be expressed by Equation (6) below.

$$P(N_k > n_k \mid \mathcal{O}) = 1 - \sum_{k=0}^{n_k} \binom{K}{k}\left(\frac{1}{S}\right)^{K-k}\left(1 - \frac{1}{S}\right)^{k} \quad (6)$$

wherein $\mathcal{O}$ may denote a third party machine learning model 320 oracle, $N_k$ may denote a random variable indicating a quantity of matched outputs from the third party machine model and the machine learning model 100, K may denote an input key length. According to some example embodiments, whether the digital watermark embedded in the machine learning model 100 is present in the third party machine learning may be determined based on whether the value P ($N_k > n_k \mid \mathcal{O}$) exceeds a threshold value p.

Table 3 below depicts pseudo programming code implementing the functions for embedding and extracting a digital watermark from the output layer of a machine learning model. For example, the client 310 may call the function key_generation in order for the detection engine 330 to generate K quantity of random input samples corresponding to the watermarking key pairs ($X^{key}, Y^{key}$) in which $X^{key}$ may be the random input sample and $Y^{key}$ may be the corresponding randomly assigned ground-truth label for the random input sample. As noted, the digital watermark may be embedded in the machine learning model 100 by fine-tuning while the presence of the digital watermark in the third party machine learning model 320 may be determined based on the outputs of the third party machine learning model 320 in response to the K quantity of random input samples. It should be appreciated that the hyper-parameters corresponding to the length of the watermarking key (e.g., the quantity K of random input samples) may be adjusted to increase security or decrease computational overhead. For instance, a larger watermarking key (e.g., a larger value K) may increase security but also the concomitant computational overhead.

TABLE 3

```
import DeepSigns
from DeepSigns import key_generation
from DeepSigns import count_response_mismatch
from DeepSigns import compute_mismatch_threshold
from utils import create_model
generate WM key pairs
model = create_model(model topology)
model.load_weights('baseline_weights')
($X^{key}$,$Y^{key}$) = key_generation(model, K,$X^{train}$ ,pdf)
$X^{retrain}$ = np.vstack ($X^{key}$,$X^{train}$ )
$Y^{retrain}$ = np.vstack ( $Y^{key}$,$Y^{train}$ )
embed WM by finetuning the model with the WM key model.fit(
$X^{retrain}$ ,$Y^{retrain}$ )
query model with key set to detect WM
$Y^{pred}$ = model.predict ($X^{key}$ )
m = count_response_mismatch ($Y^{pred}$ ,$Y^{key}$ )
θ = compute_mismatch_threshold (p, K, C)
WM_detected = 1 if m < θ else 0
```

In some example embodiments, to identify the rarely explored regions of the machine learning model 100, the detection engine 330 may apply Principal Component Analysis (PCA) on activation maps acquired by passing training data through the converged machine learning model 100. The resulting eigenvectors may be used to transform the high dimensional activation maps into a lower dimensional subspace. The Principal Component Analysis transformation may be encoded as a dense layer inserted after the second-to-last layer of the original tensor graph the machine learning model 100 in order to minimize data movement when performing the data projection. The weights of the new dense layer may be obtained from the eigenvectors of the Principal Component Analysis transformation of the pertinent activations. The density of the activations within a Euclidean distance E of a randomly generated input sample may be computed in order to determine whether to include the randomly generated input sample in the set of K random input samples corresponding to the watermarking keys. As noted, the set of K random input samples may exclude any random sample associated with a above threshold density.

It should be appreciated that the digital watermark embedded in the hidden layers and/or the output layer of the machine learning model may be an effective digital watermark by least satisfying the requirements set forth in Table 4 below. For instance, the digital watermark may be reliable because an owner of the machine learning model 100 is able to extract, from the third party machine learning model 320, the digital watermark embedded in the machine learning model 100 if the third party machine learning model 320 is a duplicate of the machine learning model 100 and/or is trained using the proprietary training data as the machine learning model 100. Alternatively and/or additionally, the digital watermark may have integrity because it is associated with minimal false alarms in which the third party machine learning model 320 is erroneously identified as being a duplicate of the machine learning model 100 and/or trained using the proprietary training data as the machine learning model 100.

TABLE 4

| Requirements | Description |
| --- | --- |
| Fidelity | Accuracy of the target neural network shall not be degraded as a result of watermark embedding. |
| Reliability | Watermark extraction shall yield minimal false negatives; WM shall be effectively detected using the pertinent keys. |
| Robustness | Embedded watermark shall be resilient against model modifications such as pruning, fine-tuning, or WM overwriting. |
| Integrity | Watermark extraction shall yield minimal false alarms (a.k.a., false positives); the watermarked model should be uniquely identified using the pertinent keys. |
| Capacity | Watermarking methodology shall be capable of embedding a large amount of information in the target DNN. |
| Efficiency | Communication and computational overhead of watermark embedding and extraction shall be negligible. |
| Security | The watermark shall be secure against brute-force attacks and leave no tangible footprints in the target neural network; thus, an unauthorized party cannot detect/remove the presence of a watermark. |
| Generality | Watermarking methodology should be applicable to different datasets and machine learning architectures. The watermarking methodology should further support different deployment scenarios including, for example, machine learning models presented in white-box settings as well as black-box settings. |

Figure 5A:
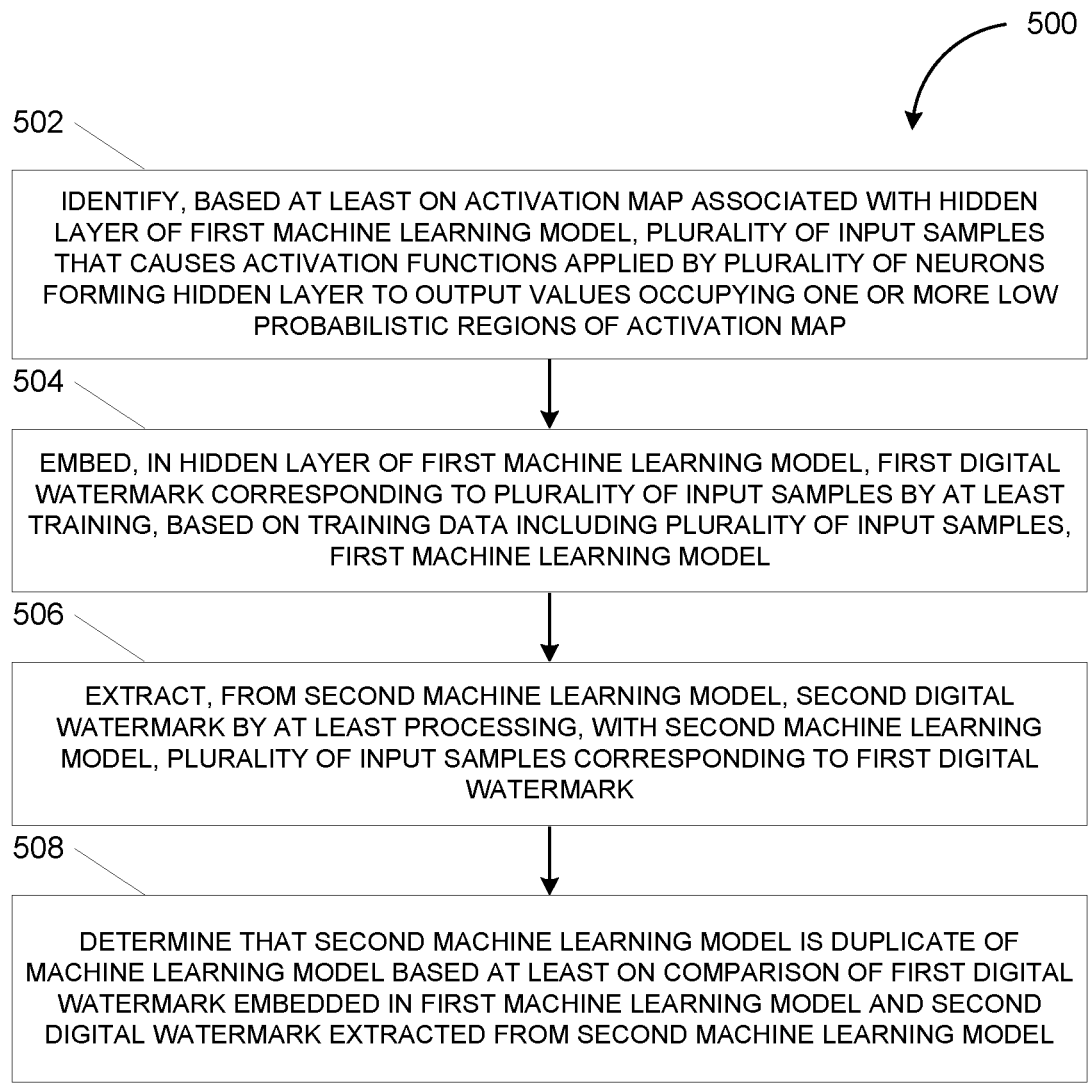
FIG. 5A depicts a flowchart illustrating a process for embedding and extracting a digital watermark in a hidden layer of a machine learning model, in accordance with some example embodiments.

FIG. 5A depicts a flowchart illustrating a process 500 for embedding and extracting a digital watermark in a hidden layer of a machine learning model, in accordance with some example embodiments. Referring to FIGS. 1-4 and 5A, the process 500 may be performed by the detection engine 330 in order to embed a digital watermark the hidden layers of the machine learning model 100 including, for example, the input layer 110, the first intermediate layer 120*a*, and/or the second intermediate layer 120*b*. Furthermore, the process 500 may be performed by the detection engine 330 in order to extract, from the third party machine learning model 320, a digital watermark. A misuse of the machine learning model 100 may be detected based at least on a comparison of the digital watermark embedded in the machine learning model 100 and the digital watermark extracted from the third party machine learning model 320.

At 502, the detection engine 330 may identify, based at least on an activation map associated with a hidden layer of a first machine learning model, a plurality of input samples that causes the activation functions applied by a plurality of neurons forming the hidden layer to output values occupying one or more low probabilistic regions of the activation map. For instance, the activation map associated with a hidden layer of the machine learning model 100 may enumerate the different output values of the activation functions applied by the neurons forming that layer of the machine learning model 100. Referring to FIGS. 1-2, the activation map associated with the first intermediate layer 120*a* may enumerate the output values (e.g., $f(\Sigma_i w_i x_i + b)$ and/or the like) of the activation functions applied by each of the x quantity of neurons in the first intermediate layer 120*a*. The detection engine 330 may identify input samples affecting only the low probabilistic regions of the activation map in order to avoid diminishing the overall accuracy of the machine learning model 100. For instance, the detection engine 330 may learn the probability density function (PDF) associated with the activation map in order to identify input samples altering only the low probabilistic regions of the activation map. As noted, the low probabilistic regions of an activation map may be occupied by values having a low probability of being output by the one or more activation functions included in the corresponding layer of the machine learning model 100. Accordingly, the detection engine 330 may identify an input sample if that input sample causes the activation functions in the corresponding layer of the machine learning model 100 to output values that are otherwise not output and/or infrequently output by the activation functions.

At 504, the detection engine 330 may embed, in the hidden layer of the first machine learning model, a first digital watermark corresponding to the plurality of input samples by at least training, based on training data that includes the plurality of input samples, the first machine learning model. For example, a digital watermark may be embedded in the machine learning model 100 by at least training the machine learning model 100 based on training data that includes one or more input samples configured to alter the low probabilistic regions of the activation map. The one or more input samples altering the low probabilistic regions of the activation map of the machine learning model 100 may correspond to watermarking keys for subsequently extracting the digital watermark. In some example embodiments, to train the machine learning model 100 using training data that includes the input samples corresponding to the watermarking keys, the detection engine 330 may minimize a loss function for the machine learning model 100 that includes the first loss term $loss_1$ to maximize isolation between activations and/or the second loss term $loss_2$ to ensure that the embedded digital watermark match the digital watermark specified by the owner of the machine learning model 100.

At 506, the detection engine 330 may extract, from a second machine learning model, a second digital watermark by at least processing, with the second machine learning model, the plurality of input samples corresponding to the first digital watermark. For example, the third party machine learning model 320 may process the input samples corresponding to the watermarking keys. As noted, these input samples may be configured to alter the low probabilistic regions of the activation map of the machine learning model 100. It should be appreciated that the input samples may trigger the same or similar activations in the third party machine learning model 320 if the third party machine learning model 320 is a duplicate of the machine learning model 100 and/or is trained using the same proprietary training data used to train the machine learning model 100.

At 508, the detection engine 330 may determine that the second machine learning model is a duplicate of the first machine learning model based at least on a comparison of the first digital watermark embedded in the first machine learning model and the second digital watermark extracted from the second machine learning model. For example, the third party machine learning model 320 may be tested for misuse by at least extracting, from the hidden layers of the third party machine learning model 320, the digital watermark embedded in the hidden layers of the machine learning model 100. In some example embodiments, the detection engine 330 may compute a bit error rate (BER) between the digital watermark embedded in the machine learning model 100 and the digital watermark extracted from the third party machine learning model 320. The digital watermark embedded in the machine learning model 100 may not be present in the third party machine learning model 320 if the bit error rate (BER) between the digital watermark embedded in the machine learning model 100 and the digital watermark extracted from the third party machine learning model 320 exceeds a threshold value. By contrast, if the bit rate error does not exceed the threshold value, then the third party machine learning model 320 may be a duplicate of the machine learning model 100 and/or trained using the same proprietary training data as the machine learning model 100.

Figure 5B:
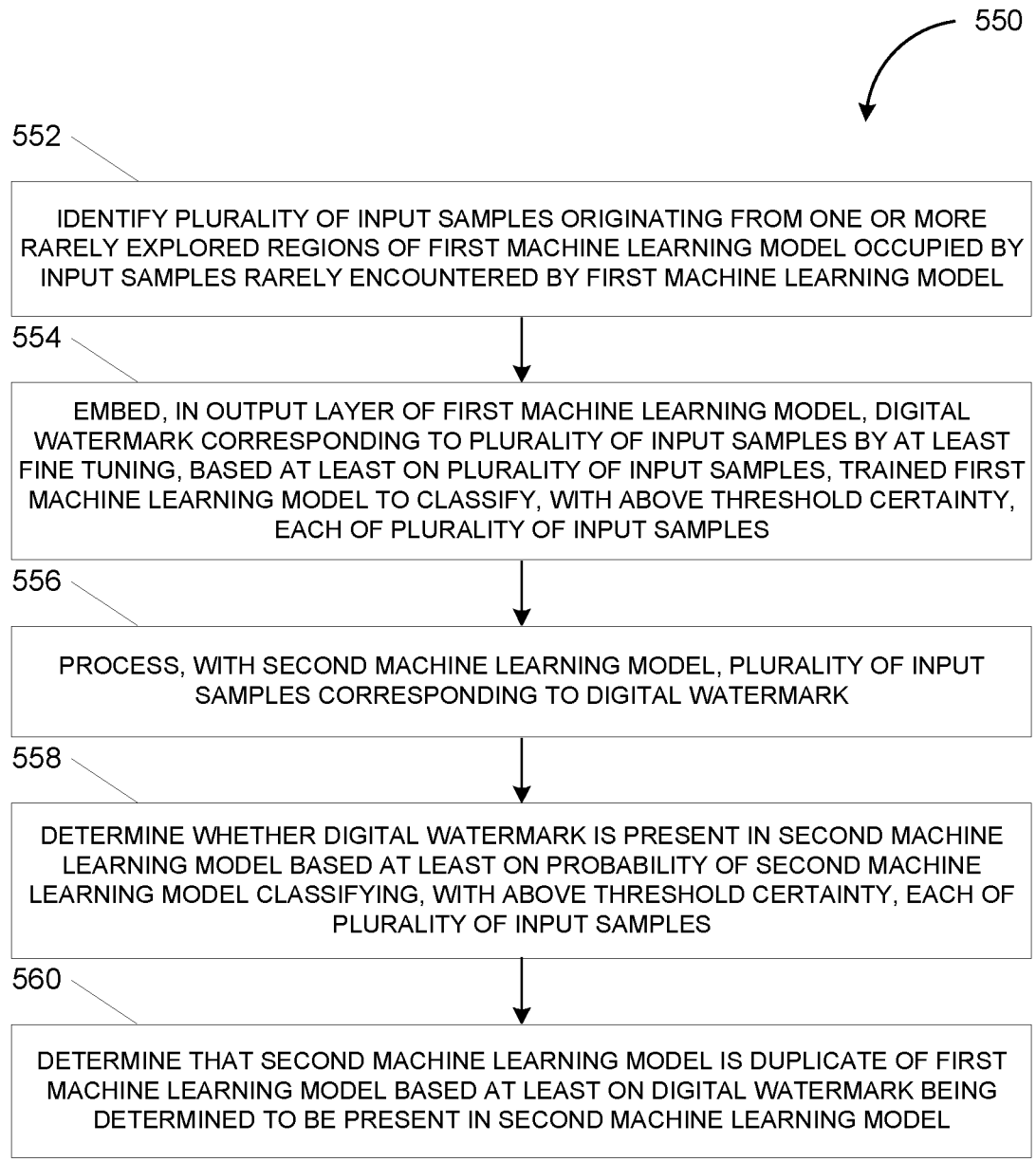
FIG. 5B depicts a flowchart illustrating a process for embedding and extracting a digital watermark in an output layer of a machine learning model, in accordance with some example embodiments.

FIG. 5B depicts a flowchart illustrating a process 550 for embedding and extracting a digital watermark in an output layer of a machine learning model, in accordance with some example embodiments. Referring to FIGS. 1-4 and 5B, the process 550 may be performed by the detection engine 330 in order to embed a digital watermark in the output layer 130 of the machine learning model 100. Moreover, the process 500 may be performed by the detection engine 330 in order to extract, from the third party machine learning model 320, a digital watermark. A misuse of the machine learning model 100 may be detected based at least on a comparison of the digital watermark embedded in the machine learning model 100 and the digital watermark extracted from the third party machine learning model 320.

At 552, the detection engine 330 may identify a plurality of input samples originating from one or more rarely explored regions of a first machine learning model occupied by input samples rarely encountered by the first machine learning model. In some example embodiments, the detection engine 330 may embed a digital watermark in the output layer 130 of the machine learning model 100 by at least generating input samples that adjust the tails of the decision boundaries between different classes in order to introduce, into the output layer 130, a statistical bias associated with the input samples. This statistical bias may cause the machine learning model 100 to consistently assign these input samples as high probability members of the corresponding classes despite the machine learning model 100 rarely encountering such input samples during actual training of the machine learning model 100.

At 554, the detection engine 330 may embed, in the output layer of the first machine learning model, a digital watermark corresponding to the plurality of input samples by at least fine-tuning, based at least on the plurality of input samples, the trained first machine learning model to classify, with an above-threshold certainty, each of the plurality of input samples. In some example embodiments, the digital watermark may be embedded in the output layer 130 of the machine learning model 100 after the machine learning model 100 has completed training and one or more digital watermarks have already been embedded in the hidden layers (e.g., the input layer 110, the first intermediate layer 120a, and the second intermediate layer 120b) of the machine learning model 100. For example, to embed a digital watermark in the output layer 130 of the machine learning model 100, the trained machine learning model 100 may be fined tuned by at least processing, with the trained machine learning model 100, a mixture of random input samples from the K' quantity of random input samples and a subset of the original training data used to train the machine learning model 100. The fine-tuning of the trained machine learning model 100 may include retraining the trained machine learning model such that the machine learning model 100 is able to assign, with an above threshold certainty (e.g., probability of greater than 99%), at least some of the K' quantity of the random input samples to a corresponding class. Once the fine-tuning of the trained machine learning model 100 is complete, the watermarking keys associated with the output layer 130 may be determined by at least identifying and removing, from the K' quantity of random input samples, random input samples that trigger false positives and/or false negatives.

At 556, the detection engine 330 may process, with a second machine learning model, the plurality of input samples corresponding to the digital watermark. In some example embodiments, the third party machine learning model 320 may process the K quantity of the random input samples corresponding to the ground-truth label vector. As noted, the watermarking keys may form the pairs ($X^{key}$, $Y^{key}$) in which $X^{key}$ may be the random input sample and $Y^{key}$ may be the corresponding randomly assigned ground-truth label for the random input sample. The digital watermark may be extracted from the output layer of the third party machine learning model 320 instead of the hidden layers of the third party machine learning model 320, for example, when the hidden layers of the third party machine learning model 320 are obscured and the activation maps associated with the hidden layers of the third party machine learning model 320 are unavailable for analysis. The outputs of the third party machine learning model 320 in response to the each of the K quantity of random input samples corresponding to the watermarking keys may be used to determine whether the digital watermark embedded in the output layer 130 of the machine learning model 100 is present in the output layer of the third party machine learning model 320.

At 558, the detection engine 330 may determine whether the digital watermark embedded in the output layer of the first machine learning model is present in the second machine learning model based at least a probability of the second machine learning model classifying, with the above threshold certainty, each of the plurality of input samples. As noted, if the third-party machine learning model 320 is an exact duplicate of the machine learning model 100, there should be zero mismatches between the outputs from the third party machine learning model 320 and the ground-truth labels assigned to each of the K quantity of random input samples. However, the third party machine learning model 320 is likely exhibit malicious and/or non-malicious modifications (e.g., model fine-tuning, model pruning, watermark overwriting, and/or the like) such that the third party machine learning model 320 may not always be an exact duplicate of the machine learning model 100. Accordingly, in order to determine whether the digital watermark embedded in the output layer 130 of the machine learning model 100 is present in the third party machine learning model 320, the detection engine 330 may determine a probability of the machine learning model 320 correctly classifying each of the K quantity of random input samples.

At 560, the detection engine 330 may determine that the second machine learning model is a duplicate of the first machine learning model based at least on the digital watermark being determined to be present in the second machine learning model. In some example embodiments, the digital watermark embedded in the machine learning model 100 may be present in the third party machine learning model 320 if the probability of the machine learning model 320 correctly classifying the K quantity of random input samples exceeds the threshold value p. When that is the case, the third party machine learning model 320 may be identified as being a duplicate of the machine learning model 100 and/or as having been trained using the same proprietary training data as the machine learning model 100.

Figure 6:
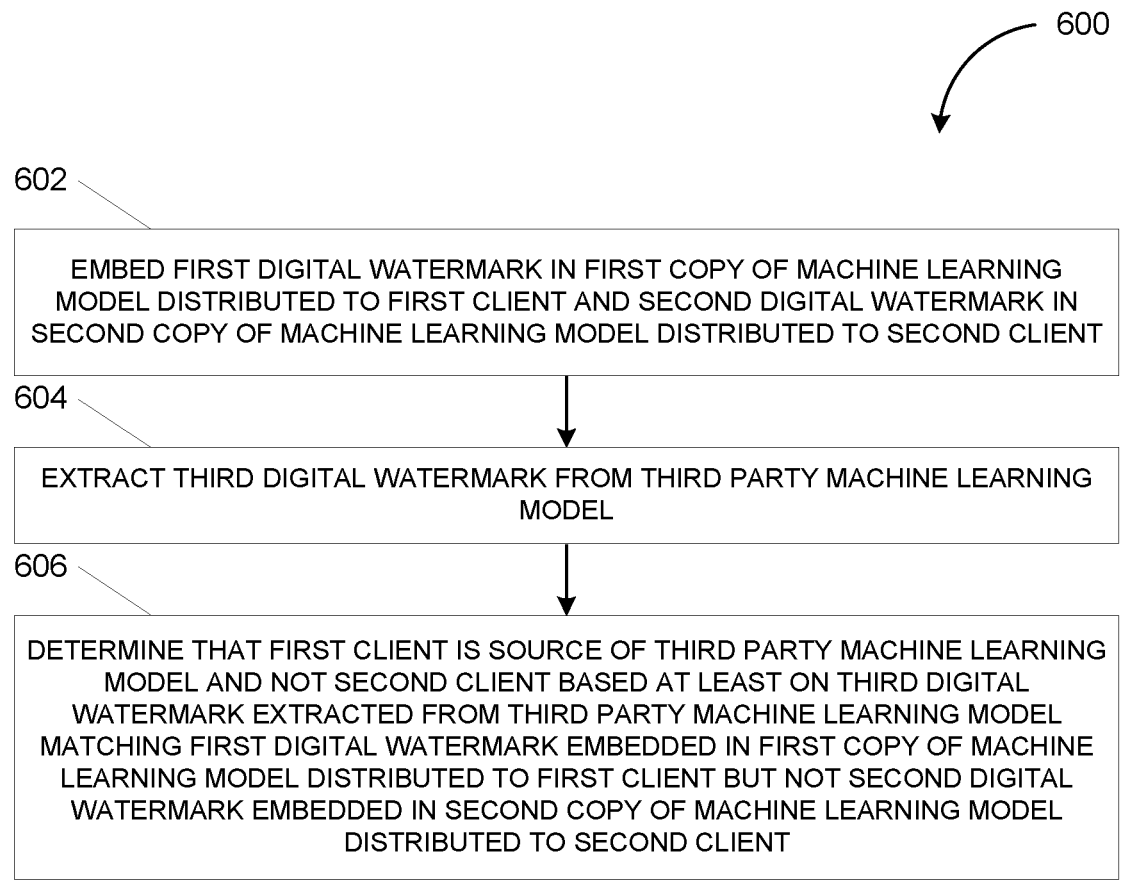
FIG. 6 depicts a flowchart illustrating a process for tracking the distribution of a machine learning model, in accordance with some example embodiments.

FIG. 6 depicts a flowchart illustrating a process 600 for tracking the distribution of a machine learning model, in accordance with some example embodiments. Referring to FIGS. 1-4, 5A-B, and 6, the process 600 may be performed by the detection engine 330 in order to embed a different digital watermark in copies of the machine learning model 100 distributed to different clients such as, for example, the first client 352a, the second client 352b, and/or the like. The detection engine 330 may further perform the process 600 in order to identify the source of the third party machine learning model 320 based at least on the digital watermark extracted from the third party machine learning model 320.

At 602, the detection engine 330 may embed a first digital watermark in a first copy of the machine learning model 100 distributed to the first client 352a and a second digital watermark in a second copy of the machine learning model 100 distributed to the second client 352b. For example, the detection engine 330 may embed the first digital watermark in a hidden layer or an output layer of the first copy of the machine learning model 100. The detection engine 330 may further embed the second digital watermark in a hidden layer or an output layer of the second copy of the machine learning model 100.

At 604, the detection engine 330 may extract a third digital watermark from the third party machine learning model 352. For instance, the detection engine 330 may extract the third digital watermark from one or more hidden layers of the third party machine learning model 352. This may be the case if the third party machine learning model 352 is presented in a white-box setting and the activations maps associated with the hidden layers of the third party machine learning model 352 are available for analysis. Alternatively, the detection engine 330 may extract the third digital watermark from the output layer of the third party machine learning model 352 if the third party machine learning model 352 is presented in a black-box setting such that the activations maps associated with the hidden layers of the third party machine learning model 352 are not available for analysis.

At 606, the detection engine 330 may determine that the first client 352a is the source of the third party machine learning model 352 and not the second client 352b based at least on the third digital watermark extracted from the third party machine learning model 320 matching the first digital watermark embedded in the first copy of the machine learning model 100 distributed to the first client 352a but not the second digital watermark embedded in the second copy of the machine learning model 100 distributed to the second client 352b.

Figure 7:
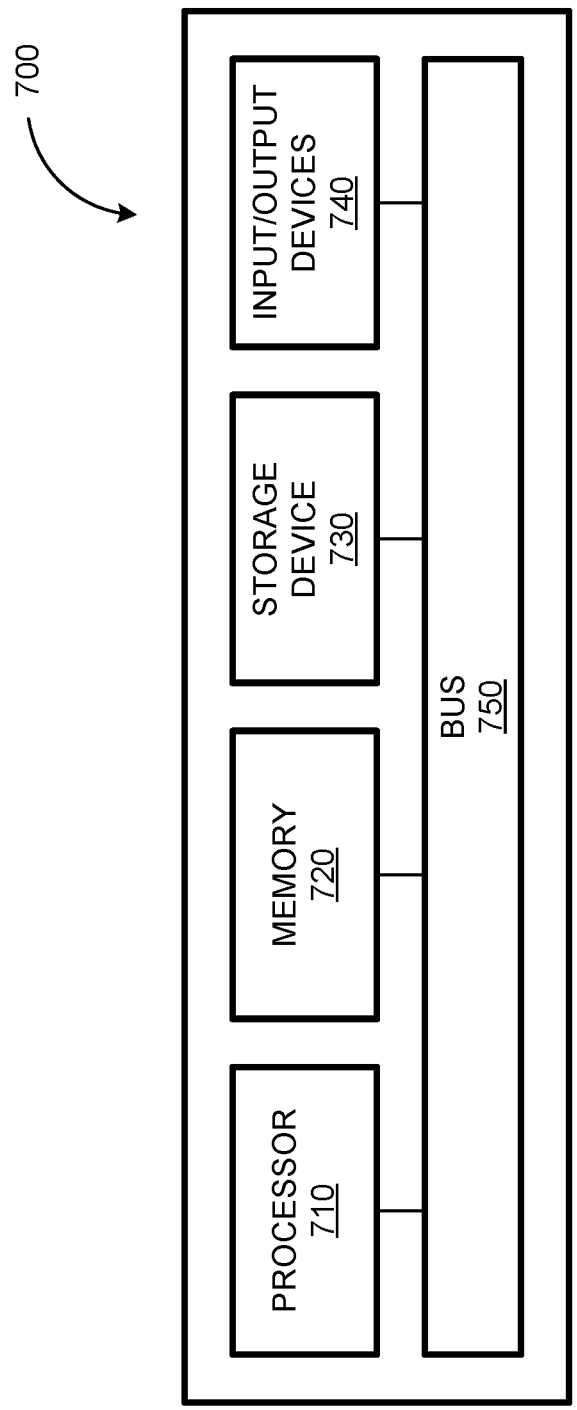
FIG. 7 depicts a block diagram illustrating a computing system, in accordance with some example embodiments.

FIG. 7 depicts a block diagram illustrating a computing system 700, in accordance with some example embodiments. Referring to FIGS. 1-3 and 7, the computing system 700 may be used to implement the machine learning model 100, the target machine learning model 320, the detection engine 330, and/or any components therein.

As shown in FIG. 7, the computing system 700 can include a processor 710, a memory 720, a storage device 730, and input/output devices 740. The processor 710, the memory 720, the storage device 730, and the input/output devices 740 can be interconnected via a system bus 750. The processor 710 is capable of processing instructions for execution within the computing system 700. Such executed instructions can implement one or more components of, for example, the machine learning model 100, the target machine learning model 320, the detection engine 330. In some implementations of the current subject matter, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some implementations of the current subject matter, the input/output device 740 includes a keyboard and/or pointing device. In various implementations, the input/output device 740 includes a display unit for displaying graphical user interfaces.

According to some implementations of the current subject matter, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

In some implementations of the current subject matter, the computing system 700 can be used to execute various interactive computer software applications that can be used for organization, analysis and/or storage of data in various (e.g., tabular) format (e.g., Microsoft Excel®, and/or any other type of software). Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 740. The user interface can be generated and presented to a user by the computing system 700 (e.g., on a computer screen monitor, etc.).

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
    at least one processor; and
    at least one memory including program code which when executed by the at least one processor provides operations comprising:
        identifying, based at least on a first activation map associated with a first hidden layer of a first machine learning model, a first plurality of input samples altering one or more low probabilistic regions of the first activation map, the first hidden layer including a plurality of neurons, each of the plurality of neurons applying an activation function to generate an output, and the one or more low probabilistic regions of the first activation map being occupied by values having below a threshold probability of being output by the plurality of neurons;

embedding, in the first hidden layer of the first machine learning model, a first digital watermark corresponding to the first plurality of input samples, the embedding of the first digital watermark includes training, based at least on training data including the first plurality of input samples, the first machine learning model;

identifying a second plurality of input samples originating from the one or more low probabilistic regions of the first machine learning model;

embedding, in an output layer of the first machine learning model, a second digital watermark by at least fine-tuning, based at least on the second plurality of input samples, the first machine learning model; and determining that a second machine learning model is a duplicate of the first machine learning model based at least on a comparison of the first digital watermark embedded in the first machine learning model and a digital watermark extracted from the second machine learning model.

2. The system of claim 1, wherein the first plurality of input samples are further identified by at least determining a probability density function (PDF) associated with the first activation map, and wherein the probability density function of the first activation map indicates a probability of a value being output by the plurality of neurons forming the first hidden layer of the first machine learning model.

3. The system of claim 1, further comprising:
extracting, from the second machine learning model, the digital watermark by at least processing, with the second machine learning model, the first plurality of input samples corresponding to the first digital watermark.

4. The system of claim 1, wherein the comparison of the first digital watermark and the digital watermark comprises determining a bit error rate (BER) between the first digital watermark and the digital watermark, and wherein the second machine learning model is determined to be a duplicate of the first machine learning model based at least on the bit error rate not exceeding a threshold value.

5. The system of claim 1, further comprising:
determining, based at least on a second activation map associated with the second machine learning model, whether the first plurality of input samples triggers, in the second activation map, a same and/or similar changes as in the first activation map, the second machine learning model being a duplicate of the first machine learning model if the first plurality of input samples triggers the same or similar changes in the second activation map as in the first activation map.

6. The system of claim 1, wherein the training of the first machine learning model includes minimizing an error in an output of the first machine learning model by at least minimizing a loss function.

7. The system of claim 6, wherein the loss function includes a loss term characterizing a distribution of values output by the neurons included in the first hidden layer of the first machine learning model.

8. The system of claim 7, wherein the loss term is minimized, during the training of the first machine learning model, to at least maximize an isolation between clusters of values output by the neurons included in the first hidden layer of the first machine learning model.

9. The system of claim 6, wherein the loss function includes a loss term characterizing a distance between the first digital watermark and another digital watermark present in the first machine learning model.

10. The system of claim 9, wherein the loss term is minimized, during the training of the first machine learning model, to at least minimize a difference between the first digital watermark and the another digital watermark present in the first machine learning model.

11. The system of claim 1, wherein the first plurality of input samples is further identified, based at least on a second activation map associated with a second hidden layer of the first machine learning model, to alter one or more low probabilistic regions of the second activation map.

12. The system of claim 1, wherein the second plurality of input samples are further identified based at least on the second plurality of input samples altering the one or more low probabilistic regions of the first activation map.

13. The system of claim 1, wherein the identifying of the second plurality of input samples includes excluding, from the second plurality of input samples, one or more input samples that cannot be correctly classified by the first machine learning model.

14. The system of claim 1, wherein the fine-tuning of the first machine learning model includes retraining, subsequent to training the first machine learning model, the first machine learning model to assign, with an above-threshold certainty, a label to each of the second plurality of input samples.

15. The system of claim 1, further comprising:
assigning, to each of the second plurality of input samples, a randomly selected label corresponding to a ground-truth label for each of the second plurality of input samples.

16. The system of claim 1, further comprising:
determining, based at least on a probability of the second machine learning model assigning a correct label to each of the second plurality of input samples, that the second machine learning model is a duplicate of the first machine learning model.

17. The system of claim 1, wherein the first digital watermark is embedded in a first copy of the first machine learning model distributed to a first client and wherein a third digital watermark is embedded in a second copy of the first machine learning model distributed to a second client, and wherein the first client is determined to be a source of the second machine learning model based at least on the digital watermark extracted from the second machine learning model matching the first digital watermark embedded in the first copy of the first machine learning model.

18. A computer-implemented method, comprising:
identifying, based at least on a first activation map associated with a first hidden layer of a first machine learning model, a first plurality of input samples altering one or more low probabilistic regions of the first activation map, the first hidden layer including a plurality of neurons, each of the plurality of neurons applying an activation function to generate an output, and the one or more low probabilistic regions of the first activation map being occupied by values having below a threshold probability of being output by the plurality of neurons;

embedding, in the first hidden layer of the first machine learning model, a first digital watermark corresponding to the first plurality of input samples, the embedding of the first digital watermark includes training, based at least on training data including the first plurality of input samples, the first machine learning model;

identifying a second plurality of input samples originating from the one or more low probabilistic regions of the first machine learning model;

embedding, in an output layer of the first machine learning model, a second digital watermark by at least fine-tuning, based at least on the second plurality of input samples, the first machine learning model; and determining that a second machine learning model is a duplicate of the first machine learning model based at least on a comparison of the first digital watermark embedded in the first machine learning model and a digital watermark extracted from the second machine learning model.

19. A non-transitory computer readable medium storing instructions, which when executed by at least one data processor, result in operations comprising:

identifying, based at least on a first activation map associated with a first hidden layer of a first machine learning model, a first plurality of input samples altering one or more low probabilistic regions of the first activation map, the first hidden layer including a plurality of neurons, each of the plurality of neurons applying an activation function to generate an output, and the one or more low probabilistic regions of the first activation map being occupied by values having below a threshold probability of being output by the plurality of neurons;

embedding, in the first hidden layer of the first machine learning model, a first digital watermark corresponding to the first plurality of input samples, the embedding of the first digital watermark includes training, based at least on training data including the first plurality of input samples, the first machine learning model;

identifying a second plurality of input samples originating from the one or more low probabilistic regions of the first machine learning model;

embedding, in an output layer of the first machine learning model, a second digital watermark by at least fine-tuning, based at least on the second plurality of input samples, the first machine learning model; and determining that a second machine learning model is a duplicate of the first machine learning model based at least on a comparison of the first digital watermark embedded in the first machine learning model and a digital watermark extracted from the second machine learning model.

* * * * *